US009594498B2

(12) United States Patent
Dean et al.

(10) Patent No.: US 9,594,498 B2
(45) Date of Patent: Mar. 14, 2017

(54) INTEGRATED FINGERPRINT SENSOR AND NAVIGATION DEVICE

(71) Applicant: Synaptics Incorporated, San Jose, CA (US)

(72) Inventors: Gregory Lewis Dean, Phoenix, AZ (US); Richard Alexander Erhart, Tempe, AZ (US); Jaswinder Jandu, Chandler, AZ (US); Anthony Russo, New York, NY (US); Erik Thompson, Phoenix, AZ (US)

(73) Assignee: Synaptics Incorporated, San Jose, CA (US)

( * ) Notice: Subject to any disclaimer, the term of this patent is extended or adjusted under 35 U.S.C. 154(b) by 85 days.

(21) Appl. No.: 14/621,048

(22) Filed: Feb. 12, 2015

(65) Prior Publication Data

US 2015/0153923 A1 Jun. 4, 2015

Related U.S. Application Data

(63) Continuation of application No. 12/792,496, filed on Jun. 2, 2010, now Pat. No. 9,001,040.

(51) Int. Cl.
*G06K 9/00* (2006.01)
*G06F 3/0487* (2013.01)
(Continued)

(52) U.S. Cl.
CPC ............ *G06F 3/0487* (2013.01); *G06F 3/021* (2013.01); *G06F 3/0304* (2013.01);
(Continued)

(58) Field of Classification Search
CPC .................................... G06K 9/00; G06F 3/00
(Continued)

(56) References Cited

U.S. PATENT DOCUMENTS 5,812,252 A * 9/1998 Bowker ................ F41A 17/066
250/227.11
6,088,471 A * 7/2000 Setlak ................ G06K 9/00053
382/116

(Continued)

FOREIGN PATENT DOCUMENTS

EP 1775674 A1 4/2007
EP 2219136 A1 8/2010
(Continued)

OTHER PUBLICATIONS

Notice of Examination Opinion from Taiwan Intellectual Property Office in TW Patent Application No. 100119395, Dec. 24, 2014.

(Continued)

*Primary Examiner* — Abolfazl Tabatabai
(74) *Attorney, Agent, or Firm* — Leydig, Voit & Mayer, LTD

(57) ABSTRACT

An apparatus is disclosed in a first embodiment of the invention as including a non-conductive substrate providing a first surface onto which a user can apply a fingerprint. A fingerprint sensing circuit is applied to a second surface of the non-conductive substrate opposite the first surface. The fingerprint sensing circuit is capable of sensing a fingerprint through the non-conductive substrate. A navigation device is positioned adjacent to (e.g., below) the non-conductive substrate and is capable of being manipulated by the user through the non-conductive substrate.

29 Claims, 8 Drawing Sheets

(51) Int. Cl.
  *G06F 3/0354* (2013.01)
  *G06F 3/02* (2006.01)
  *G06F 3/03* (2006.01)
  *G06F 3/0338* (2013.01)
  *G05B 19/00* (2006.01)

(52) U.S. Cl.
  CPC ........ *G06F 3/0338* (2013.01); *G06F 3/03543* (2013.01); *G06F 3/03545* (2013.01); *G06F 3/03547* (2013.01); *G06F 3/03549* (2013.01); *G06K 9/0002* (2013.01); *G06F 2203/0336* (2013.01); *G06F 2203/0338* (2013.01)

(58) Field of Classification Search
  USPC ....... 382/116, 124, 126, 115; 340/5.53, 5.83
  See application file for complete search history.

(56) References Cited

U.S. PATENT DOCUMENTS

| | | | |
|---|---|---|---|
| 6,408,087 B1 * | 6/2002 | Kramer | G06K 9/3208 209/584 |
| 6,522,773 B1 | 2/2003 | Houdeau | |
| 7,280,679 B2 * | 10/2007 | Russo | G06F 3/0414 340/5.53 |
| 8,736,001 B2 | 5/2014 | Salatino et al. | |
| 2003/0063445 A1 | 4/2003 | Fischbach et al. | |
| 2007/0146117 A1 | 6/2007 | Slevin | |
| 2008/0049980 A1 | 2/2008 | Castaneda et al. | |
| 2008/0267457 A1 | 10/2008 | Ali et al. | |
| 2008/0317300 A1 | 12/2008 | Pai et al. | |
| 2010/0208953 A1 * | 8/2010 | Gardner | G06K 9/00006 382/124 |

FOREIGN PATENT DOCUMENTS

| | | |
|---|---|---|
| TW | M312720 | 5/2007 |
| TW | 200901047 | 1/2009 |

OTHER PUBLICATIONS

Search Report in TW Patent Application No. 100119395, Dec. 9, 2009.
Search Report issued by the UK Intellectual Property Office on Oct. 14, 2016.

* cited by examiner

INTEGRATED FINGERPRINT SENSOR AND NAVIGATION DEVICE

BACKGROUND

This invention relates to fingerprint sensors and navigation devices and more particularly to apparatus and methods for integrating fingerprint sensors and navigation devices.

Navigation devices, such as pointing devices (e.g., mice, touchpads, trackballs, pointing sticks, etc), buttons, joysticks, and directional pads or buttons, are increasingly common in today's electronic devices, including computers, cell phones, PDAs, music players, calculators, and other GUI-based devices. These navigation devices may enable a user to quickly navigate between screens, icons, pages, lines, files, folders, windows, tabs, or the like on a GUI of an electronic device. Nevertheless, as electronic devices continue to shrink and provide ever expanding functionality, real estate on these devices is becoming increasingly scarce. Thus, many electronic devices require navigation devices that are compact while still being ergonomic and easy to use.

Access control is also a significant concern with modern electronic devices due to their ability to store increasing amounts of private, sensitive, or confidential information. Although reusable passwords are probably the most common technique to authenticate and identify a user of a device, other techniques are also being developed to counter the numerous ways that reusable passwords may be compromised. For example, fingerprint sensors provide one potential method for identifying and authenticating a user. Fingerprints, like various other biometric characteristics, are based on an unalterable personal characteristic. Nevertheless, fingerprint sensors or other biometric devices may also require valuable surface-area in order to be implemented on many of today's electronic devices.

In view of the foregoing, what are needed are apparatus and methods for integrating navigation devices and fingerprint sensors in order to conserve valuable surface area on today's electronic devices, which may include computers, cell phones, PDAs, music players, video players, calculators, navigation electronics (i.e, GPS devices) and the like. Ideally, an integrated fingerprint sensor and navigation device would be easy to use and would utilize advanced fingerprint sensors that are currently on the market or under development. As will become evident herein, apparatus and methods in accordance with the invention provide such solutions in an elegant manner.

BRIEF DESCRIPTION OF THE DRAWINGS

In order that the advantages of the invention will be readily understood, a more particular description of the invention briefly described above will be rendered by reference to specific examples illustrated in the appended drawings. Understanding that these drawings depict only typical examples of the invention and are not therefore to be considered limiting of its scope, the invention will be described and explained with additional specificity and detail through the use of the accompanying drawings, in which.

DETAILED DESCRIPTION

Figure 1:
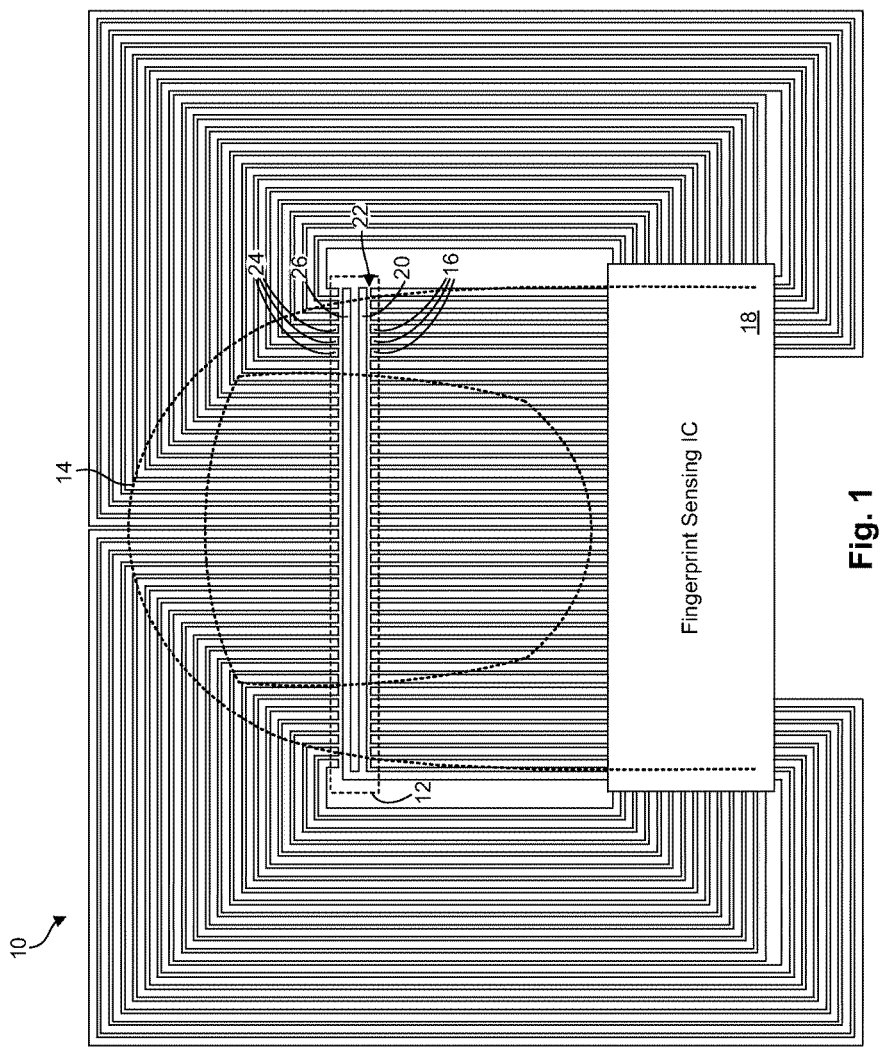
FIG. 1 is a high-level block diagram of one embodiment of a fingerprint sensing circuit.

The invention has been developed in response to the present state of the art, and in particular, in response to the problems and needs in the art that have not yet been fully solved by currently available fingerprint sensors and navigation devices. Accordingly, the invention has been developed to provide a novel apparatus and method for integrating fingerprint sensors and navigation devices. The features and advantages of the invention will become more fully apparent from the following description and appended claims and their equivalents, and also any subsequent claims or amendments presented, or may be learned by practice of the invention as set forth hereinafter.

Consistent with the foregoing, an apparatus is disclosed in a first embodiment of the invention as including a non-conductive substrate providing a first surface onto which a user can apply a fingerprint. A fingerprint sensing circuit is applied to a second surface of the non-conductive substrate opposite the first surface. The fingerprint sensing circuit is capable of sensing a fingerprint through the non-conductive substrate. A navigation device is positioned adjacent to (e.g., below) the non-conductive substrate and is capable of being manipulated by the user through the non-conductive substrate.

An apparatus is disclosed in a second embodiment of the invention as including a non-conductive substrate providing a first surface onto which a user can apply a fingerprint. A fingerprint sensing circuit is applied to a second surface of the non-conductive substrate opposite the first surface. The fingerprint sensing circuit is capable of sensing a fingerprint through the non-conductive substrate. A navigation device, capable of being manipulated by the user, is mounted to the non-conductive substrate.

An apparatus is disclosed in a third embodiment of the invention as including a navigation device for navigating a GUI. A non-conductive substrate is overlaid on a surface of the navigation device. The non-conductive substrate includes a first surface for applying a user's fingerprint. A fingerprint sensing circuit is applied to a second surface of the non-conductive substrate, opposite the first surface, and is capable of sensing a fingerprint through the non-conductive substrate.

An apparatus is disclosed in a fourth embodiment of the invention as including a non-conductive substrate providing a first surface onto which a user can apply a fingerprint. A sensor circuit is applied to a second surface of the non-conductive substrate, opposite the first surface, to sense a fingerprint that is applied to the first surface. The sensor circuit is further configured to detect pressure applied by a finger to the first surface by detecting the width of fingerprint ridges on the first surface.

It will be readily understood that the components of the present invention, as generally described and illustrated in the Figures herein, could be arranged and designed in a wide variety of different configurations. Thus, the following more detailed description of the embodiments of apparatus and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Referring to FIG. 1, in selected embodiments, a fingerprint sensing circuit 10 useable with an apparatus and method in accordance with the invention may include a fingerprint sensing area 12 to sense a fingerprint as it is swiped thereacross. A dotted outline of a finger 14 is shown superimposed over the fingerprint sensing area 12 to provide a general idea of the size and scale of one possible embodiment of a fingerprint sensing area 12. The size and shape of the fingerprint sensing area 12 may vary, as needed, for different applications.

In certain embodiments, the fingerprint sensing area 12 may include an array of transmitting elements 16, such as a linear array of transmitting elements 16, to assist in scanning lines of "pixels" as a fingerprint is swiped across the fingerprint sensing area 12. In this embodiment, the transmitting elements 16 are shown as a linear array of conductive traces 16 connected to a fingerprint sensing integrated circuit (IC) 18. The transmitting elements 16 are not drawn to scale and may include several hundred transmitting elements 16 arranged across the width of a fingerprint, one transmitting element 16 per pixel. A fingerprint image may be generated by scanning successive lines of pixels as a finger is swiped over the array. These lines may then be assembled to generate a fingerprint image, similar to the way a fax image is generated using line-by-line scanning.

In certain embodiments, the transmitting elements 16 are configured to sequentially emit, or burst, a probing signal, one after the other. The probing signal may include a burst of probing pulses, such as a burst of square waves. This probing signal may be sensed on the receiving end by a receiving element 20. Like the transmitting elements 16, the receiving element 20 is shown as a conductive trace 20 connected to the fingerprint sensing IC 18. Although shown as a single receiving element 20, in other embodiments, pairs of receiving elements 20 may be used to differentially cancel out noise.

At the receiving element 20, a response signal may be generated in response to the probing signal. The magnitude of the response signal may depend on factors such as whether a finger is present over the fingerprint sensing area 12 and, more particularly, whether a ridge or valley of a fingerprint is immediately over the gap 22 between a transmitting element 16 and the receiving element 20. The magnitude of the signal generated at the receiving element 20 may be directly related to the RF impedance of a finger ridge or valley placed over the gap 22 between the corresponding transmitting element 16 and the receiving element 20.

By using a single receiving element 20 (or a small number of receiving elements 20) and a comparatively larger number of transmitting elements 16, a receiver that is coupled to the receiving element 20 may be designed to be very high quality and with a much better dynamic range than would be possible using an array of multiple receiving elements. This design differs from many conventional fingerprint sensors, which may employ a single large transmitting element with a large array of receiving elements and receivers. Nevertheless, the apparatus and methods described herein are not limited to the illustrated transmitter and receiver design. Indeed, the apparatus and methods disclosed herein may be used with fingerprint sensors using a small number of transmitting elements and a relatively large number of receiving elements, a large number of transmitting elements and a relatively small number of receiving element, or a roughly equal number of transmitting and receiving elements.

As shown in FIG. 1, the fingerprint sensing area 12 (including the transmitting and receiving elements 16, 20) may be electrically connected but physically decoupled from the fingerprint sensing IC 18. Positioning the sensing elements 16, 20 off the silicon die may improve the reliability of the fingerprint sensing circuit 10 by reducing the sensor's susceptibility to electrostatic discharge, wear, and breakage. This may also allow the cost of the fingerprint sensing circuit 10 to be reduced over time by following a traditional die-shrink roadmap. This configuration provides a distinct advantage over direct contact sensors (sensors that are integrated onto the silicon die) which cannot be shrunk to less than the width of an industry standard fingerprint. Nevertheless, certain embodiments of the invention may be applicable to conventional direct contact sensors.

In certain embodiments in accordance with the invention, a second array of transmitting elements 24 is provided adjacent to the first array of transmitting elements 16. This second array of transmitting elements 24 may communicate with a second receiving element 26 which may, in certain embodiments, electrically connect to the first receiving element 20, as shown in FIG. 1. In certain embodiments, the second array of transmitting elements 24 may be used in combination with the first array of transmitting elements 16 to determine the velocity of a finger as it is swiped over the fingerprint sensing area 12. The two arrays of transmitting elements 16, 24 together form a dual-line imager. Lines of fingerprint data scanned by the second array may be compared to lines of fingerprint data scanned by the first array to determine the velocity of the finger. This velocity measurement may be used to generate an accurate non-distorted fingerprint image.

Figure 2A:
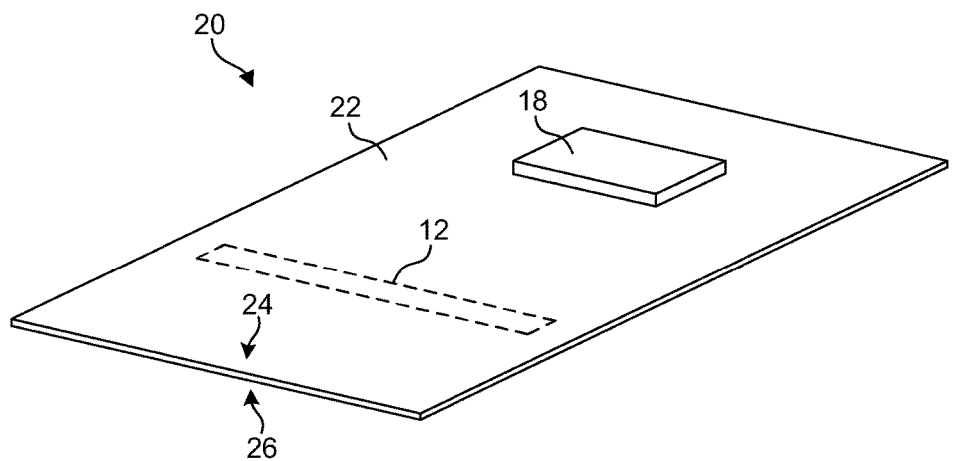
FIG. 2A is a perspective view of one embodiment of a fingerprint sensor comprising a fingerprint sensing circuit on a non-conductive substrate.

Referring to FIG. 2A, one embodiment of a fingerprint sensor 20 in accordance with the invention is illustrated. As shown, the fingerprint sensor 20 includes a flexible non-conductive substrate 22 having a circuit side 24 and a sensing side 26. A fingerprint sensing circuit, such as the fingerprint sensing circuit 10 illustrated in FIG. 1, may be printed or otherwise adhered to the circuit side 24 of the substrate 22 using any suitable lithographic or application technique. The fingerprint sensing circuit 10 may be bonded to the flexible substrate 22 using any suitable technique such as using a chip-on-flex (COF) process. The fingerprint sensing IC 18 and the fingerprint sensing area 12 of the fingerprint sensing circuit 10 are shown on the circuit side 24 of the substrate 22 for illustration purposes. A user may swipe his or her finger over the fingerprint sensing area 12 on the sensing side 26 of the substrate 22 in order to scan a fingerprint.

In certain embodiments, the substrate 22 is fabricated from a flexible polyimide material marketed under the trade name Kapton®. In certain embodiments, the substrate 22 has a thickness between about 25 and 100 μm. The Kapton® polymer allows the fingerprint sensor 20 to be applied to products such as touchpads and molded plastics having a variety of shapes and contours while at the same time providing exceptional durability and reliability. Nevertheless, embodiments of the invention are not limited to this type of substrate 22 but may include other flexible or rigid substrates 22 suitable for applying a circuit thereon.

The fingerprint sensing circuit 10 on the circuit side 24 of the substrate 22 is not limited to the circuit 10 illustrated in FIG. 1. For example, other fingerprint sensing circuits that may potentially be used are disclosed in U.S. Pat. No. 7,146,024 and entitled "Swiped Aperture Capacitive Fingerprint Sensing Systems and Methods," which is herein incorporated by reference. Other information for implementing fingerprint sensing circuits in accordance with the invention may be found in U.S. Patent Pub. No. 2005/0244038 and entitled "Finger Position Sensing Methods and Apparatus" and U.S. Patent Pub. No. 2006/0083411 and entitled "Fingerprint Sensing Assemblies and Methods of Making," which are also incorporated by reference. These references disclose fingerprint sensing circuits that may potentially be used with the integrated fingerprint sensor and navigation device disclosed herein and do not represent an exhaustive list. Indeed, certain embodiments of the invention disclosed herein may be used with many different types of fingerprint sensing circuits including, in some cases, conventional direct-contact fingerprint sensing circuits.

One benefit of the fingerprint sensor 20 illustrated in FIG. 2A is that a user's finger is isolated from the fingerprint sensing circuit 10. That is, the user's finger is swiped along the sensing side 26 of the flexible substrate 22 as opposed to the circuit side 24. The sensing elements 16, 20, 24, 26 (not shown) on the circuit side 24 are able to detect changes in capacitance as the finger is swiped across the sensing side 26 of the substrate 22. Thus, the substrate 22 may electrically and physically isolate a user's finger from the fingerprint sensing circuit 10, thereby providing some degree of protection from electrostatic discharge and mechanical abrasion.

Figure 2B:
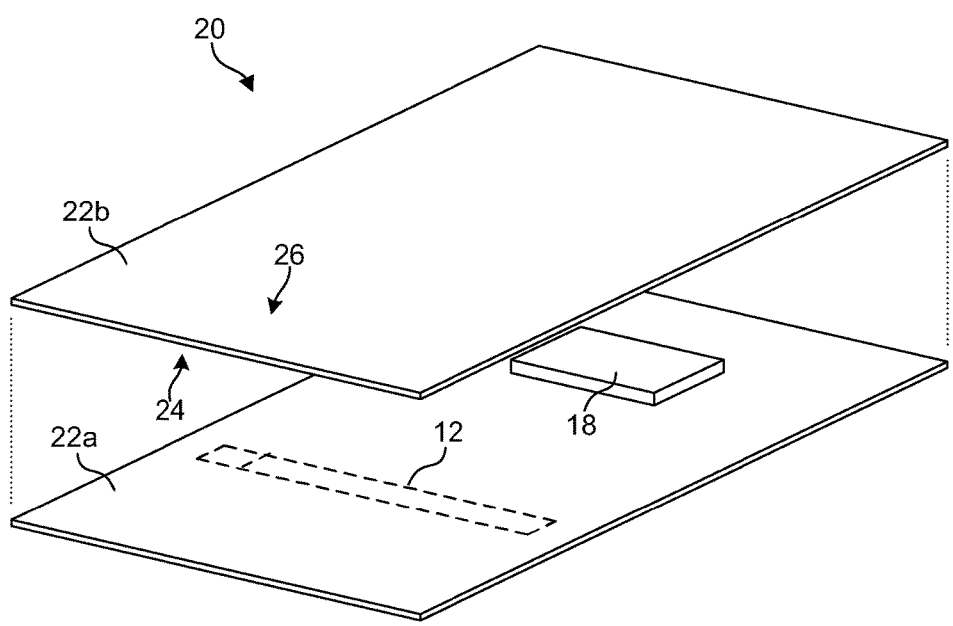
FIG. 2B is a perspective view of another embodiment of a fingerprint sensor comprising a fingerprint sensing circuit sandwiched between non-conductive substrates.

Referring to FIG. 2B, in another embodiment, a fingerprint sensor 20 in accordance with the invention may include several layers 22a, 22b, or substrates 22a, 22b, sandwiched together. For example, in one embodiment, the fingerprint sensing circuit 10 may be printed or otherwise attached to a first non-conductive substrate 22a. The substrate 22a may include various flexible or rigid substrate materials suitable for receiving a conductive circuit. In certain embodiments, the substrate 22a and fingerprint sensing circuit 10 are provided in the form of a conventional printed circuit board (PCB).

A second non-conductive layer 22b or substrate 22b may be placed over the fingerprint sensing circuit 10 of the first layer 22a. For example, a flexible polyimide layer 22b such as a layer 22b of Kapton® may be used to cover the fingerprint sensing circuit 10 (shown by the fingerprint sensing IC 18 and the fingerprint sensing area 12), thereby sandwiching the fingerprint sensing circuit 10 between the two layers 22a, 22b.

To read a fingerprint, a user's finger may be swiped across a sensing side 26 of the layer 22b without directly touching the fingerprint sensing circuit 10. The fingerprint sensing circuit 10 may be thought of as being on the circuit side 24 of the substrate 22b, since it is in contact therewith. Thus, the user's finger may be electrically and physically isolated from the fingerprint sensing circuit 10. The sensing elements 16, 20, 24, 26 (not shown) may read the user's fingerprint by detecting changes in capacitance as the finger is swiped across the sensing side 26 of the layer 22b.

Figure 3:
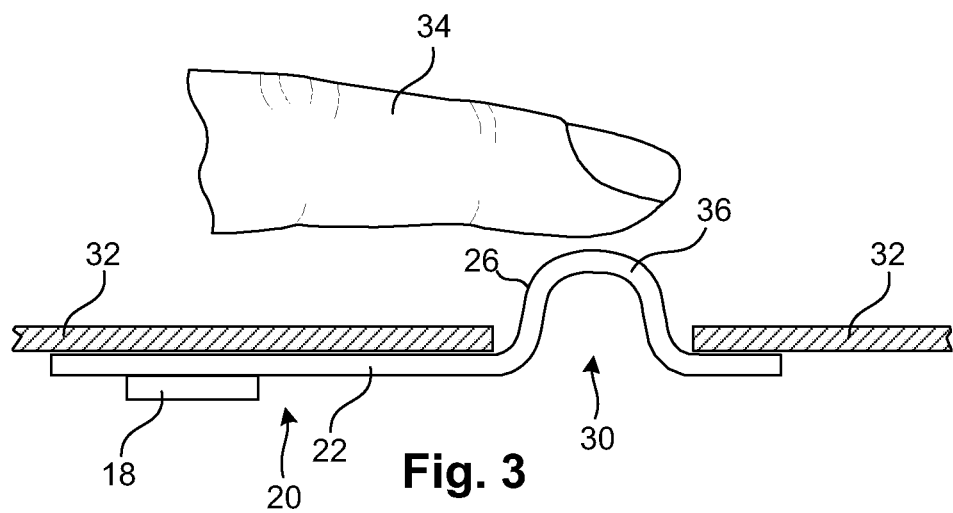
FIG. 3 is a profile view of one embodiment of a fingerprint sensor integrated into the housing of an electronic device.

Referring to FIG. 3, in selected embodiments, a fingerprint sensor 20 in accordance with the invention, such as a sensor 20 illustrated in FIG. 2A or 2B, may be exposed through an opening 30 in the housing 32 of an electronic device, such as the housing of a computer, cell phone, PDA, music player, calculator, navigation apparatus, or other GUI-based device. This allows a user to swipe a finger 34 across the sensing side 26 of the fingerprint sensor 20. In certain embodiments, the fingerprint sensing area 12 is exposed to the user through the opening 30, leaving the remainder of the fingerprint sensor 20 enclosed and protected within the electronic device. In selected embodiments, the flexible substrate 22 may be flexed such that it protrudes through the opening 30 in the form of a hump 36, although other shapes are also possible. The hump shape provides additional rigidity to the substrate 22 (due to its arch-like shape) where a fingerprint is swiped and also provides a protruding surface 36 that is easily sensed (i.e., seen, felt, etc.) by the user. The hump-like configuration may also use very little real estate on the electronic device. The hump-like shape (i.e., a convex shape) is provided only by way of example is not intended to be limiting. In other embodiments, the exposed fingerprint sensing area 12 is flat or even concave.

As mentioned previously, many electronic devices use a navigation device such as mouse, touchpad, trackball, pointing stick, button, switch, joystick, wheel, directional pad, or a combination thereof. Navigation devices may allow a user to quickly navigate between screens, icons, pages, lines, files, folders, windows, tabs, or the like, on a GUI. These navigation devices will typically require real estate on the electronic device, which is becoming increasingly scarce. Accordingly, it would be an advance in the art to integrate a navigation device with a fingerprint sensor 20 in accordance with the invention.

Figure 4:
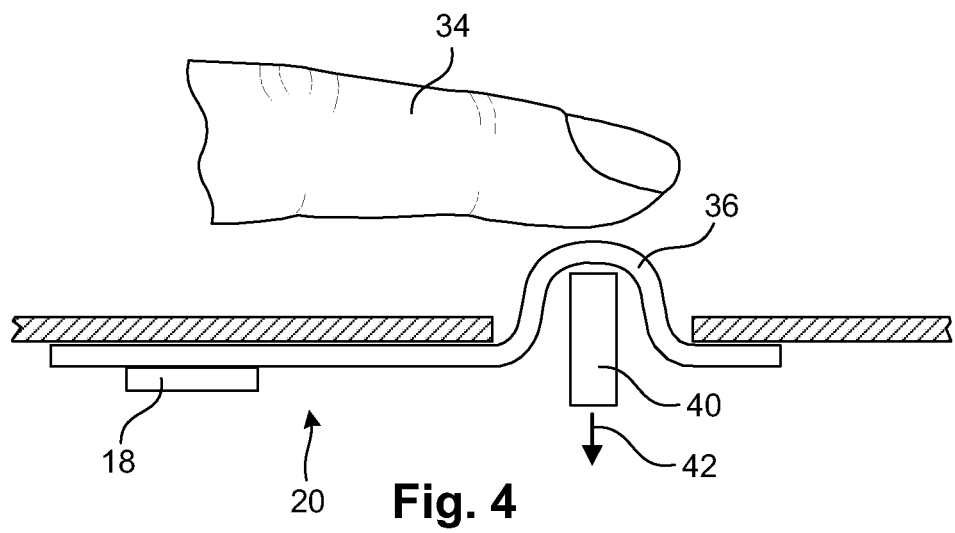
FIG. 4 is a profile view of one embodiment of a navigation device positioned below a fingerprint sensor in accordance with the invention and sensing movement in a single direction.

Referring to FIG. 4, in certain embodiments in accordance with the invention, a navigation device 40, such as a selection device 40, may be positioned below the fingerprint sensor 20, such as beneath the hump 36 described in association with FIG. 3. For purposes of this description, a selection device 40 may include a button, switch, sensor, key, or other mechanism for triggering an event or controlling some aspect of an electronic device. In certain embodiments, the selection mechanism 40 is configured to sense movement in a single direction 42, thereby operating like many buttons, switches, keys, or sensors commonly used in electronic components. In certain embodiments, the selection device 40 enables a user to select or click an icon, page, line, file, folder, window, tab, or the like, similar to the way the left button of a computer mouse functions.

Figure 5:
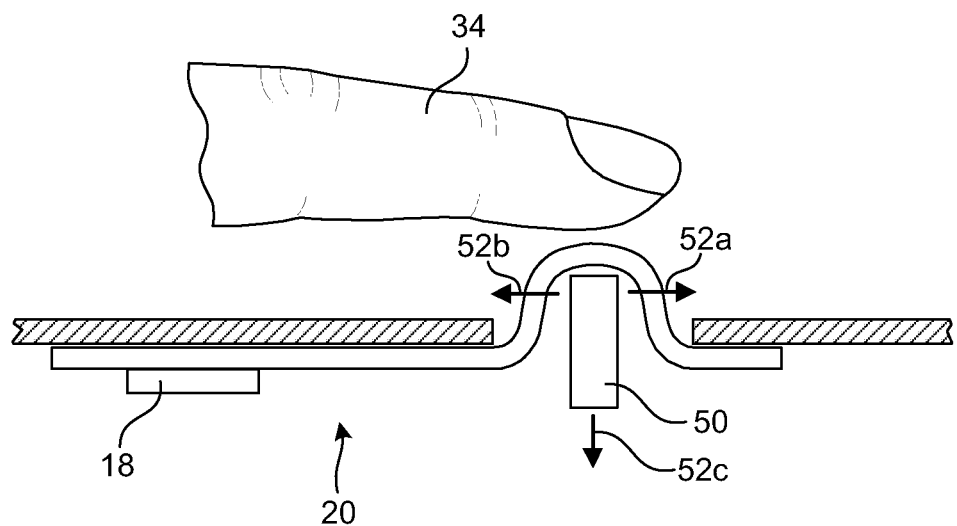
FIG. 5 is a profile view of one embodiment of a navigation device positioned below a fingerprint sensor in accordance with the invention and sensing movement in multiple directions.

Referring to FIG. 5, in other embodiments, a navigation device 50 such as a joystick 50 or other directional navigation device 50 or sensor 50 may be positioned below the fingerprint sensor 20. Such a device 50 may allow a user to move one or more directions 52a, 52b by urging the device 50 in a forward and/or backward direction 52a, 52b. For example, the device 50 may enable a user to scroll up or down through a document or a list of items on a GUI or allow the user to move a cursor or pointer around the GUI.

In certain embodiments, the navigation device 50 enables a finite number of discrete movements (e.g., forward, back, left, right, and possibly diagonal movements). In other embodiments, the navigation device 50 enables a user to select an almost infinite number of positions, such as by enabling 360° movement similar to an analog joystick. In certain embodiments, the navigation device 50 may also allow a user to click on or select an item, image, or object (similar to the left-hand button on a mouse) by urging the navigation device 50 in a downward direction 52c, similar to the selection device 40 of FIG. 4.

In certain embodiments, the navigation device 50 pivots with respect to a point or axis when urged in the directions 52a, 52b. In other embodiments, the navigation device 50 is translated laterally in the directions 52a, 52b without rotating or pivoting.

Figure 6:
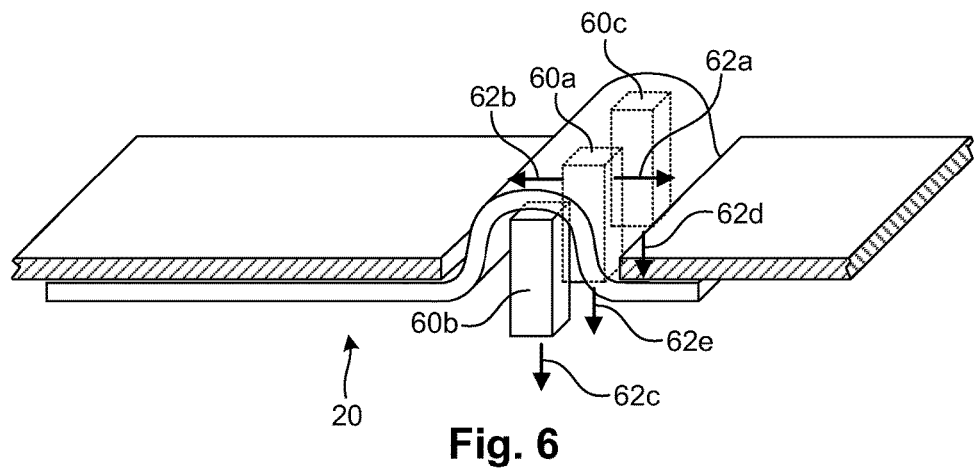
FIG. 6 is a perspective view of one embodiment comprising multiple navigation devices positioned below a fingerprint sensor in accordance with the invention.

Referring to FIG. 6, in certain embodiments, multiple navigation devices 60, such as those as illustrated in FIGS. 4 and 5, may be positioned beneath the fingerprint sensor 20. For example, a central device 60a may be positioned beneath the fingerprint sensor 20 at or near its center, and peripheral devices 60b, 60c may be positioned beneath the fingerprint sensor 20 on either side of the central device 60a. The central device 60a may be used to scroll or move a cursor up or down by moving the central device 60a in the directions 62a, 62b. The peripheral devices 60b, 60c, on the other hand, may be used to scroll or move a cursor left or right by simply urging the peripheral devices in downward directions 62c, 62d, respectively. In selected embodiments, the central device 60a may be urged in a downward direction 62e to select or click on an item, similar to the way the left-hand button on a mouse functions.

In other embodiments, the peripheral devices 60b, 60c may be configured to allow a user to scroll or move a cursor up or down a GUI by moving the devices 60b, 60c in the directions 62a, 62b, like the central device 60a. Various other configurations and variations using multiple navigation devices 60 beneath the fingerprint sensor 20 are possible and within the scope of the invention.

Figure 7A:
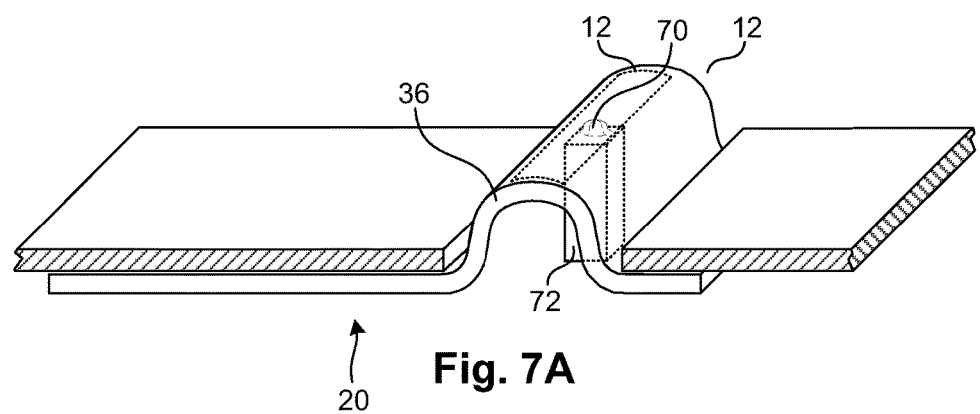
FIG. 7A is a perspective view of one embodiment of a navigation device positioned below a tactile feature on a fingerprint sensor.

Referring to FIG. 7A, in selected embodiments, a tactile feature 70, such as a bump, dimple, indentation, groove, ridge, depression, border, or the like may be formed or incorporated into a surface of the fingerprint sensor 20 at or near the fingerprint sensing area 12 (in this example the hump 36). A user may utilize the tactile feature 70 to identify where a navigation device 72 is located beneath the fingerprint sensor 20 and aid a user in finding or returning to a "home" position. This may provide a function similar to the bumps located on the "F" and "J" keys of a standard QWERTY keyboard. The tactile feature 70 may be useful in applications such as mobile phones where the fingerprint sensor 20 is located on the back of the device and used for navigation while facing the screen, such that the user cannot see the sensor 20 and his or her finger. In such an application, the tactile feature 70 may be helpful to position the user's finger by touch instead of sight.

Figure 7B:
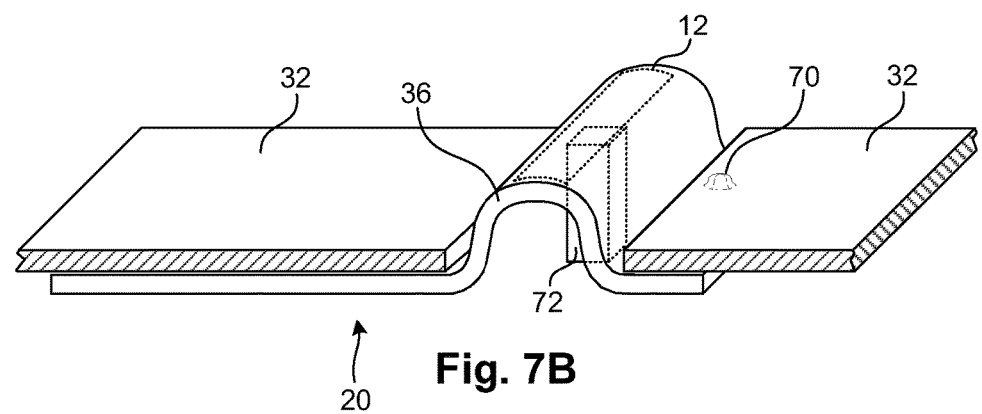
FIG. 7B is a perspective view of one embodiment of a tactile feature placed on the housing of an electronic device near a fingerprint sensor.

The tactile feature 70 may be designed such that it is small enough to not interfere, or at least minimally interfere, with the sensing capability of the fingerprint sensor 20. Thus, the tactile feature 70 may be located on a leading or trailing edge of the fingerprint sensing area 12, between or away from image or velocity sensing components, or at locations where interference with sensing will be minimal. In selected embodiments, a user may actuate the navigation device 72 by simply locating a finger over the tactile feature 70 and moving the device 72 in an appropriate direction. In other embodiments, the tactile feature 70 is placed on the housing 32 near the fingerprint sensing area 12, as illustrated in FIG. 7B.

Figure 8A:
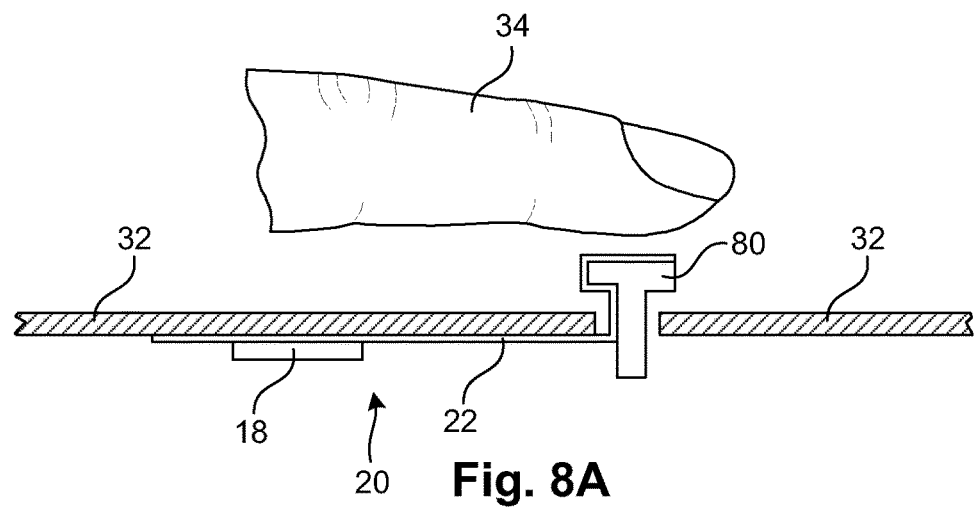
FIG. 8A is a profile view of one embodiment of the fingerprint sensing area, having a substantially flat contour, overlaid on a navigation device.

Referring to FIG. 8A, in other embodiments, a fingerprint sensor 20 may be overlaid or incorporated into a button, joystick, pointing stick, or other pointing device (hereinafter referred to as a "navigation device" 80). This navigation device 80 may sense movement in one or more directions. In this embodiment, the fingerprint sensing area 12 of the sensor 20 may be overlaid, attached, or otherwise incorporated into a top side of the navigation device 80. In certain embodiments, the remainder of the fingerprint sensor 20 may be attached or enclosed within a housing 32 of an electronic device.

Figure 8B:
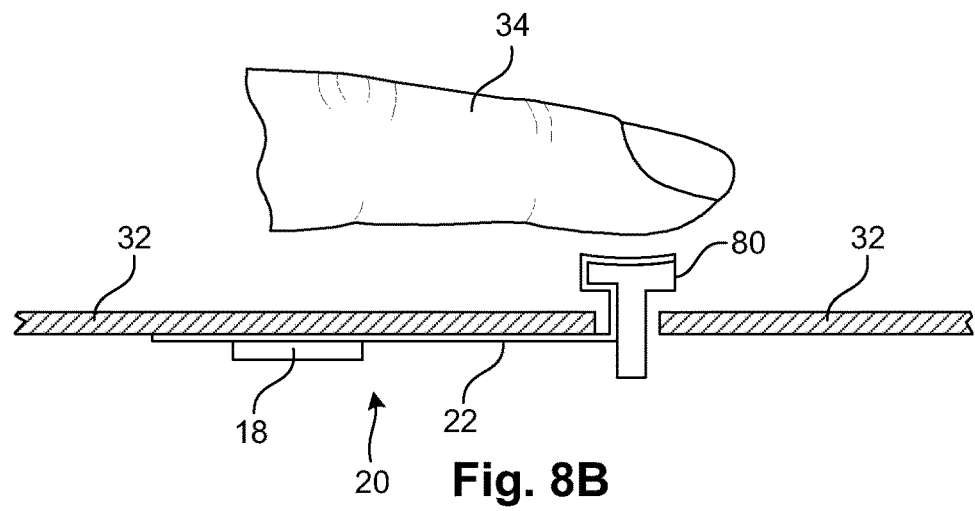
FIG. 8B is a profile view of one embodiment of a fingerprint sensing area, having a concave contour, overlaid on a navigation device.
Figure 8C:
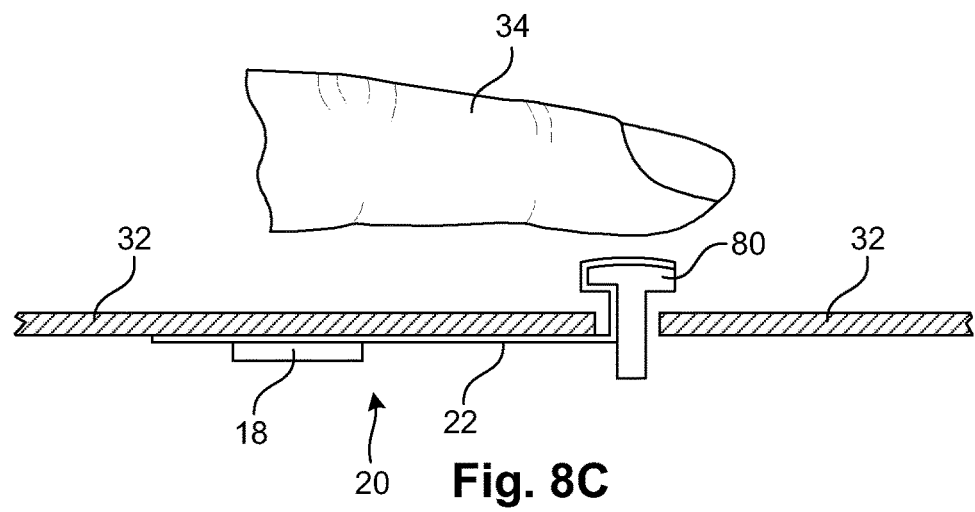
FIG. 8C is a profile view of one embodiment of a fingerprint sensing area, having a convex contour, overlaid on a navigation device.

The navigation device 80 may be designed to have any suitable shape. FIG. 8A shows the fingerprint sensor 20 conforming to a substantially flat surface of the navigation device 80, there providing a fingerprint sensing area 12 that is substantially flat. FIG. 8B shows the fingerprint sensor 20 conforming to a concave surface of the navigation device 80, there providing a fingerprint sensing area 12 that is concave. Such an embodiment may allow the fingerprint sensing area 12 to conform to the natural contour of the finger 34. FIG. 8C shows the fingerprint sensor 20 conforming to a convex surface of the navigation device 80, there providing a fingerprint sensing area 12 that is convex. The concave and convex shapes shown in FIGS. 8B and 8C are made possible by the flexible substrate 22 previously disclosed. Such shapes may not be possible using conventional direct-contact sensors where the finger is swiped across a silicon die. The concave and convex shapes may also provide tactile feedback to a user to know where a finger is positioned relative to the fingerprint sensing area 12.

The navigation device 80 will ideally have enough surface area to accommodate the fingerprint sensing area 12 and the swipe of a user's fingerprint. Because the substrate 22 may be fabricated from a flexible material such as Kapton® polymer, the flexible substrate 22 may allow the navigation device 80 to move relative to the housing 32, even in embodiments where the substrate 22 is attached to both the housing 32 and the navigation device 80.

Figure 9:
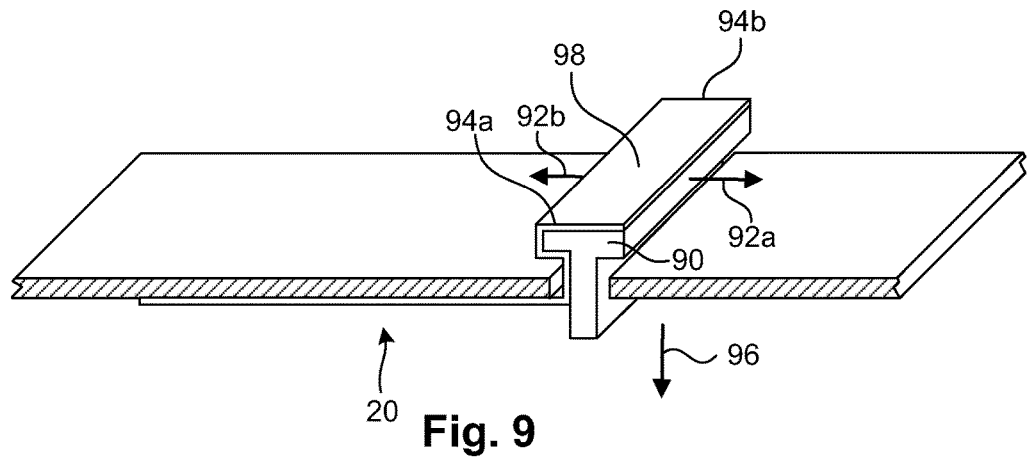
FIG. 9 is a perspective view of another embodiment of a fingerprint sensor overlaid on a navigation device.

Referring to FIG. 9, in certain embodiments, a navigation device 90 may have an elongated shape to accommodate the full width of a fingerprint. This shape may provide enough surface area to allow a user to swipe a finger across the navigation device 90, while still being compact enough for many of today's electronic devices. The navigation device 90 may also be configured to sense movement in various directions.

For example, a user may scroll or move a cursor up or down a GUI by urging the navigation device 90 in the directions 92*a*, 92*b*. The user may scroll or move a cursor right by urging an end 94*a* of the navigation device 90 in a downward direction 96, or scroll or move a cursor left by urging an opposite end 94*b* of the navigation device 90 in a downward direction 96. The navigation device 90 may also function as a selection device (similar to the left-hand button of a mouse) by pressing the center 98 of the navigation device 90 in a downward direction 96. Various other configurations and variations are also possible and within the scope of the invention.

Figure 10:
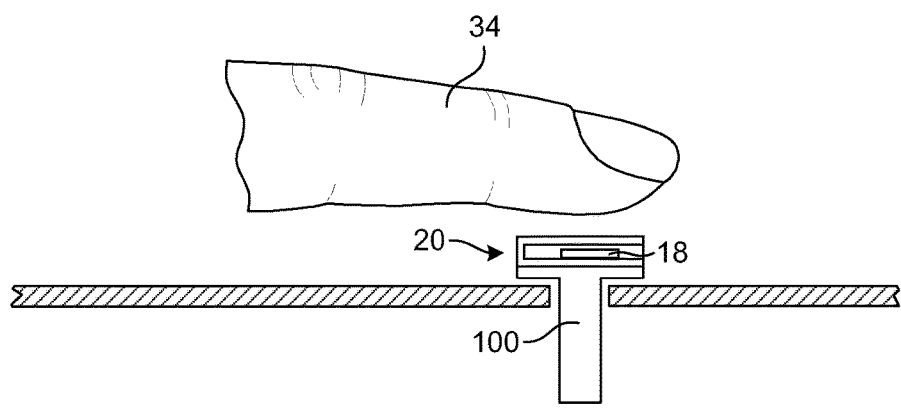
FIG. 10 is a perspective view of another embodiment of a fingerprint sensor integrated into a navigation device.

Referring to FIG. 10, in other embodiments, a fingerprint sensor 20 may be completely integrated into a navigation device 100, such as a pointing stick, button, joystick, or the like. As integrated circuits continue to shrink and provide increased functionality in a smaller package, a fingerprint sensor 20 in accordance with the invention may be incorporated partly or entirely into a navigation device 100. An interface or interconnect may be provided to allow the fingerprint sensor 20 to communicate with a processor or other circuitry external to the navigation device 100.

In addition to reducing the footprint of the fingerprint sensor 20, this embodiment may provide various manufacturing advantages. A manufacturer could produce the navigation device and integrated fingerprint sensor 20 in a single device, thereby reducing or eliminating the need to incorporate the fingerprint sensor 20 into an already existing navigation device 100. In other embodiments, instead of providing two separate components, the navigation device 100 and fingerprint sensor 20 could be provided as a modular unit ready for installation in an electronic device.

Figure 11:
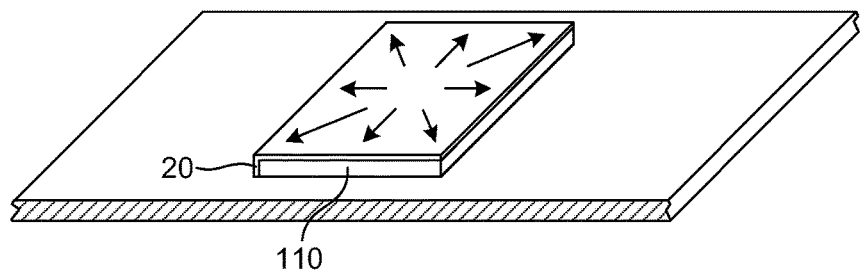
FIG. 11 is a perspective view of one embodiment of a fingerprint sensor integrated into or overlaid on a directional pad or button.

Referring to FIG. 11, in other embodiments, a fingerprint sensor 20 may be integrated with a navigation device 110 such as a directional pad 110 or directional buttons 110. Directional pads 110 are used with many of today's electronic components because they are easily manipulated with a thumb or other finger and can navigate in multiple directions. The directional pad 110 may function like a joystick or cover buttons that may be pressed by moving the directional pad 110 in different directions. The directional pad 110 may be a digital or analog device.

One benefit of integrating a fingerprint sensor 20 with a directional pad 110 is that most directional pads 110 are at least the width of a finger. Thus, a directional pad 110 may provide enough surface area to successfully integrate a fingerprint sensor 20. In other embodiments, the fingerprint sensor 20 may be integrated with a touchpad 110, such as by overlaying a fingerprint sensor 20 on a touchpad 110.

Figure 12:
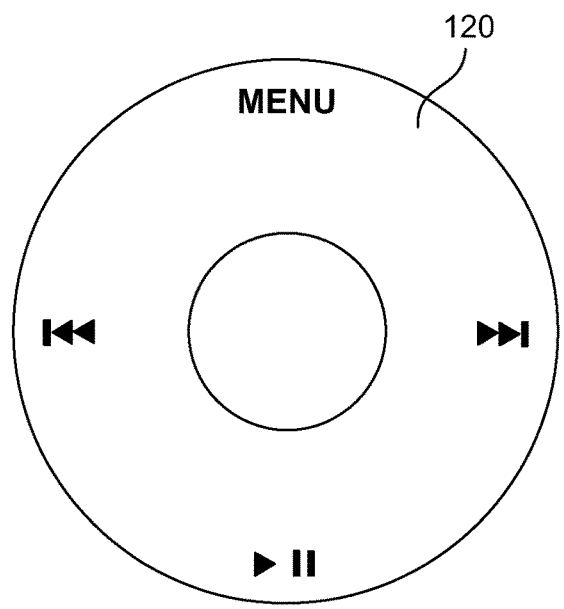
FIG. 12 is a perspective view of one embodiment of a fingerprint sensor integrated into a navigation device, such as a "click wheel"

Referring to FIG. 12, in yet other embodiments, a fingerprint sensor 20 may be integrated with a navigation device such as an iPod® "click wheel" 120 or other navigation device similar thereto. Such a navigation device 120 may allow a user to navigate a GUI by sliding a finger around the wheel or pressing buttons located beneath various portions of the wheel. For example, the click wheel 120 may have several buttons around the outer periphery of the wheel 120 and a button at or near the center of the wheel 120 which may be actuated by applying pressure to the wheel 120.

In selected embodiments a fingerprint sensor 20 may be overlaid over (or provided under) all or part of the click wheel 120 to sense a user's fingerprint and thereby control access to a device (e.g., an iPod) connected to the wheel 120. Like the directional pads described in association with FIG. 11, most click wheels 120 are at least as wide as a finger and thus may provide enough surface area to successfully incorporate a fingerprint sensor 20. Similarly, in selected embodiments, symbols, words, or images may be printed, stamped, embossed, on the fingerprint sensor 20, as they are on the click wheel 120. It should be recognized that the navigation device is not limited to click wheels 120 but may include other types of navigations devices similar thereto.

Figure 13:
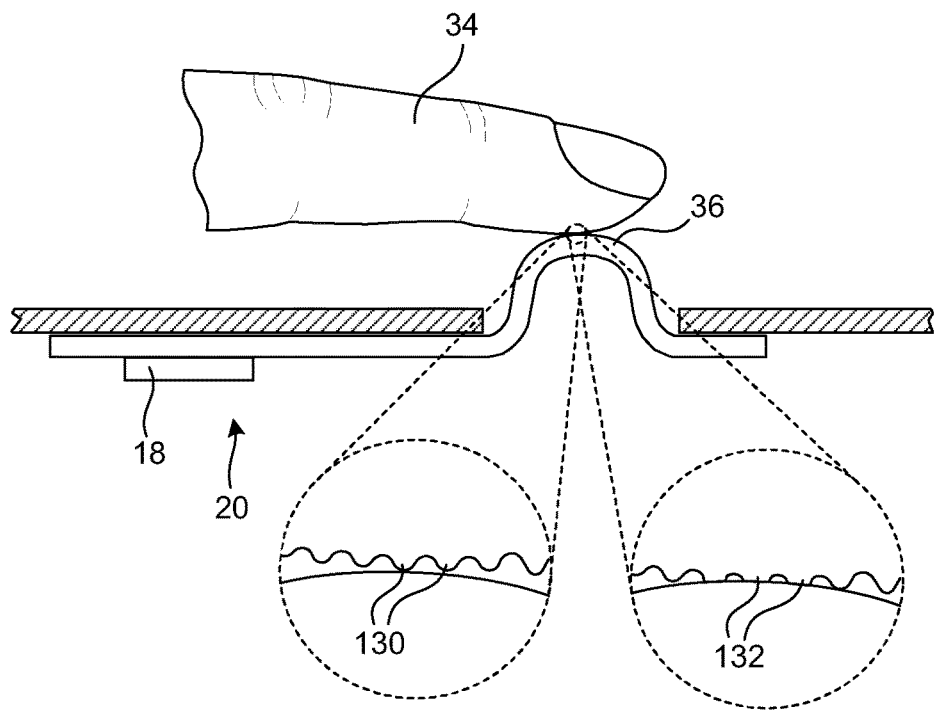
FIG. 13 is a profile view of one embodiment of a fingerprint sensor capable of detecting tapping or increased pressure.

Referring to FIG. 13, in yet another embodiment, a fingerprint sensor 20 in accordance with the invention may be configured to detect an amount of pressure applied to a surface thereof. For example, referring again to the fingerprint sensor 20 of FIG. 3, a user may swipe a finger across an exposed surface 36, such as a hump 36. If the user applies relatively light pressure to the surface 36, the sensor 20 may detect relatively narrow ridges 130 on the user's fingerprint.

On the other hand, if the user applies heavier pressure, ridges 132 of the user's fingerprint may be compressed or flattened against the surface 36. In this case, the sensor 20 may detect wider ridges 132. This feature may be used to determine if the user is lightly swiping a finger or is applying additional pressure such as might occur when a user is tapping or pressing on the surface 36. This feature may allow the fingerprint sensor 20 to function like a touchpad by detecting tapping or increased pressure. Tapping, for example, may be used to select or click on an item, icon, or image on a GUI, similar to the way a left-hand button of a mouse works.

Figure 14:
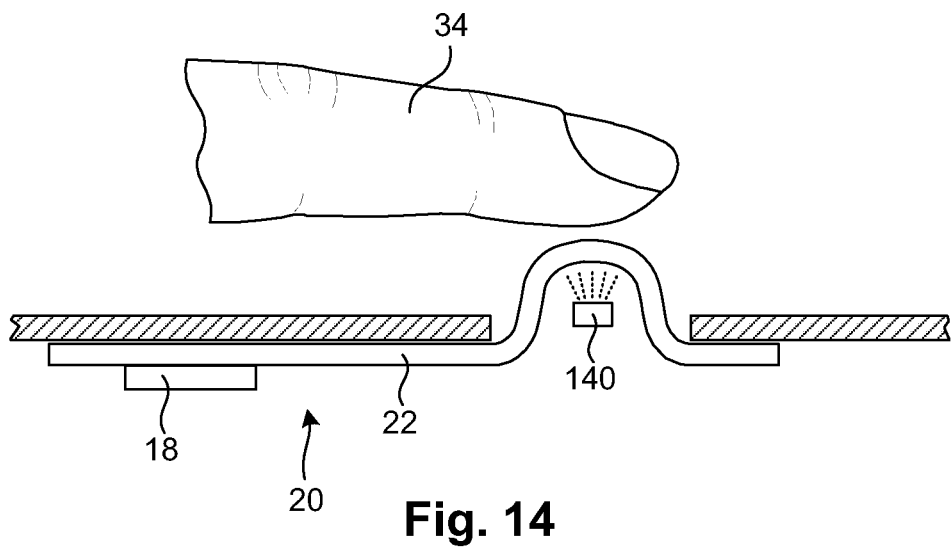
FIG. 14 is a profile view of another embodiment of a navigation device, in this example an optical sensor, positioned below a fingerprint sensing area in accordance with the invention.

Referring to FIG. 14, in selected embodiments, a navigation device such as an optical sensor 140 may be mounted beneath the fingerprint sensor 20. In such an embodiment, the substrate 22 may be fabricated from a transparent or translucent material to allow light to pass therethrough. As a finger 34 travels over the fingerprint sensor 20, the optical sensor 140 may take successive images of the finger 34 to track the finger's movements. The finger's movements may then be translated into cursor movements on a screen or GUI.

Figure 15:
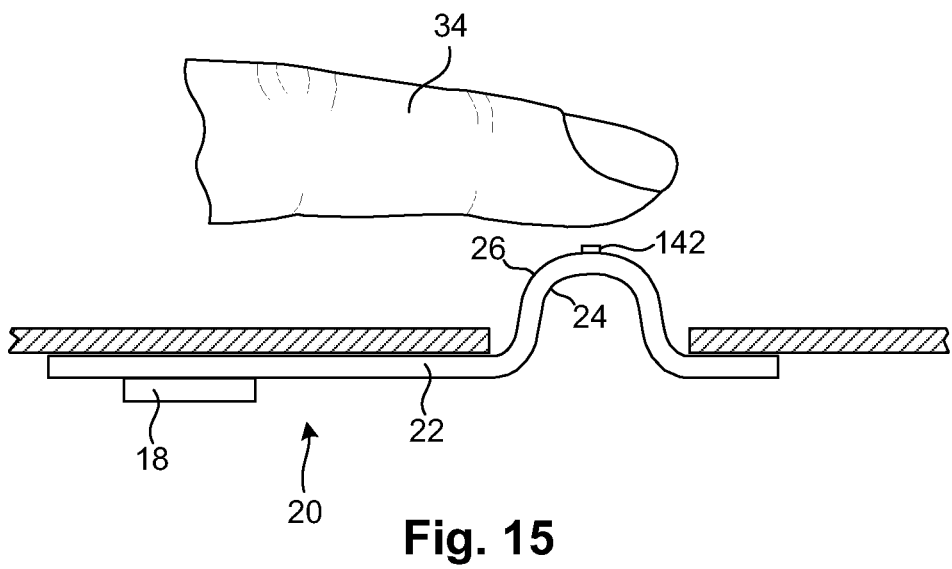
FIG. 15 is a profile view of one embodiment of a navigation device, in this example a microswitch, positioned on or near the fingerprint sensing area.

Referring to FIG. 15, in other embodiments, instead of placing a navigation device beneath the fingerprint sensor 20, a navigation device 142, such as a switch, button, or other suitable navigation device may be mounted directly to the fingerprint sensor 20. In certain embodiments, additional traces may be provided on the substrate 22 for these navigation devices 142. The navigation device 142 may be mounted on either the circuit side 24 or sensing side 26 of the substrate 22. For example, as shown in FIG. 15, a microswitch 142, operable by a user, is mounted to the sensing side 26 of the sensor 20. In other embodiments, a microswitch 142 may be mounted on the circuit side 24 of the sensor 20. Such a microswitch 142 could be actuated by detecting changes in capacitance on the sensing side 26 of the substrate 22.

It should be recognized that the sensing elements 16, 20, 24, 26 in the fingerprint sensing area 12 (such as the dual-line imager illustrated in FIG. 1) may, without alteration, be used to generate navigational data in addition to fingerprint image data. That is, imaging information generated by the fingerprint sensing circuit 10 may be used to determine velocity and direction of a finger over the fingerprint sensing area 12. Using a method similar to fingerprint image reconstruction, the velocity estimate may be generalized to recognize finger motion in any direction, including left, right, up, and down. The velocity estimates may then be converted into cursor motion on a screen, thereby enabling navigation on a device. The navigation capability may also be combined with other navigational devices, such as switches or buttons mounted on or under the substrate 22, as previously discussed, to provide full-featured navigation that includes clicks similar to a mouse button.

It should also be recognized that output from the navigation devices described in FIGS. 4 through 15 may, in certain embodiments, be routed through the fingerprint sensing IC 18. Thus, the fingerprint sensing IC 18 may be configured to process not only fingerprint data, but also navigation data received from one or more navigation devices. This may allow the operation of a fingerprint sensor 20 and navigation device to be tied together in different ways. For example, manipulating a navigation device such as a switch or button could cause the fingerprint sensor 20 to wake up and recognize that a finger is over the fingerprint sensing area 12. Similarly, manipulating a navigation device may cause a fingerprint sensor 20 to go to sleep or turn off. Routing navigation data through a fingerprint sensor 20 may also allow the fingerprint sensor 20 to exert control over a navigation device. For example, the fingerprint sensor 20 could disable the navigation device until the fingerprint sensor 20 authenticates the user. These represent just a few examples of how the functionality of the fingerprint sensor 20 and navigation device could be tied together. In other embodiments of the invention, navigation data may be routed through separate circuitry, such as through dedicated navigation circuitry, as opposed to through the fingerprint sensing IC 18.

In selected embodiments, one or more pins on the fingerprint sensing IC 18 may be used to process either fingerprint data or navigation data. For example, a pin that is normally connected to a fingerprint sensing element 16, 24 to receive pixel data may, in certain embodiments, be connected to a navigation device such as a switch or button. The fingerprint sensing IC 18 may then determine whether the switch or button is turned on or off by examining the pixel data received from the switch or button. In this way, pins normally used to receive fingerprint data may also be used to receive navigation data, and vice versa, thereby increasing the versatility of the fingerprint sensing IC 18. In other embodiments, one or more dedicated pins may be provided on the fingerprint sensing IC 18 to receive and process navigation data received from one or more navigation devices.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user device, comprising:
a housing having an opening;
a fingerprint sensor having a flexible substrate, a fingerprint sensing area exposed through the opening of the housing, and a plurality of fingerprint sensing elements configured to sense a fingerprint of a finger that is present over the fingerprint sensing area; and
a navigation device disposed below the fingerprint sensing area,
wherein a first portion of the flexible substrate is disposed under the fingerprint sensing area and a second portion of the flexible substrate is enclosed within the housing,
wherein the fingerprint sensing area includes a plurality of transmitting elements configured to emit a probing signal and a plurality of receiving elements configured to receive a response signal in response to the probing signal.

2. The user device of claim 1, wherein the first portion of the flexible substrate is attached to the navigation device.

3. The user device of claim 1, wherein the second portion of the flexible substrate is attached to the housing.

4. The user device of claim 1, wherein the flexible substrate is attached to both the navigation device and the housing.

5. The user device of claim 1, wherein the navigation device comprises a selection device positioned below the flexible substrate.

6. The user device of claim 5, wherein the selection device comprises a switch or button.

7. The user device of claim 1, wherein the flexible substrate comprises a flexible polyimide material.

8. The user device of claim 1, wherein the fingerprint sensor further comprises a fingerprint sensing IC.

9. The user device of claim 8, wherein the fingerprint sensing IC is attached to the second portion of the flexible substrate enclosed within the housing.

10. The user device of claim 8, wherein the plurality of fingerprint sensing elements are electrically connected but physically decoupled from the fingerprint sensing IC.

11. The user device of claim 8, wherein the fingerprint sensing IC is configured to process navigation data received from the navigation device.

12. The user device of claim 1, wherein the plurality of fingerprint sensing elements are integrated into a silicon die.

13. The user device of claim 1, wherein the fingerprint sensor is configured to wake up in response to manipulation of the navigation device.

14. The user device of claim 1, wherein the navigation device comprises a pointing device.

15. The user device of claim 1, wherein the flexible substrate is fabricated from a transparent or translucent material.

16. The user device of claim 1, wherein the fingerprint sensor is configured to generate navigational data and fingerprint image data from the plurality of sensing elements.

17. The user device of claim 1, wherein the housing is a housing of a cell phone.

18. A user device, comprising:
a housing having an opening;
a fingerprint sensor having a flexible substrate, a fingerprint sensing area exposed through the opening of the housing, and a plurality of fingerprint sensing elements configured to sense a fingerprint of a finger that is present over the fingerprint sensing area; and
a navigation device disposed below the fingerprint sensing area,
wherein a first portion of the flexible substrate is disposed under the fingerprint sensing area and a second portion of the flexible substrate is enclosed within the housing,
wherein the fingerprint sensing area includes a plurality of receiving elements configured to receive a response signal in response to a probing signal, wherein a magnitude of the response signal is related to an RF impedance of a finger ridge or valley.

19. A user device, comprising:
a fingerprint sensor having a flexible substrate, a fingerprint sensing area, and a plurality of fingerprint sensing elements configured to sense a fingerprint of a finger that is present over the fingerprint sensing area,
wherein the fingerprint sensing area is configured to be exposed through an opening of a housing,
wherein the fingerprint sensing area is configured to be positioned above a navigation device,
wherein a first portion of the flexible substrate is disposed under the fingerprint sensing area and a second portion of the flexible substrate is configured to be enclosed within the housing, and
wherein the fingerprint sensing area includes a plurality of transmitting elements configured to emit a probing signal and a plurality of receiving elements configured to receive a response signal in response to the probing signal.

20. The user device of claim 19, wherein the second portion of the flexible substrate is attachable to the housing.

21. The user device of claim 19, wherein the flexible substrate is attachable to both the navigation device and the housing.

22. The user device of claim 19, wherein the fingerprint sensor further comprises a fingerprint sensing IC, wherein the fingerprint sensing IC is attached to the second portion of the flexible substrate.

23. The user device of claim 19, wherein the fingerprint sensor further comprises a fingerprint sensing IC, wherein the plurality of fingerprint sensing elements are electrically connected but physically decoupled from the fingerprint sensing IC.

24. The user device of claim 19, wherein the fingerprint sensor further comprises a fingerprint sensing IC, wherein the fingerprint sensing IC is configured to process navigation data received from the navigation device.

25. The user device of claim 19, wherein the fingerprint sensor is configured to wake up in response to manipulation of the navigation device.

26. The user device of claim 19, wherein the fingerprint sensor is configured to generate navigational data and fingerprint image data from the plurality of sensing elements.

27. A user device, comprising:
a housing having an opening;
a fingerprint sensor having a fingerprint sensing IC enclosed within the housing, a flexible substrate, a fingerprint sensing area exposed through the opening of the housing, and a plurality of fingerprint sensing elements configured to sense a fingerprint of a finger that is present over the fingerprint sensing area; and
a switch or button disposed below the fingerprint sensing area,
wherein a first portion of the flexible substrate is disposed under the fingerprint sensing area and a second portion of the flexible substrate is enclosed within the housing, and
wherein the fingerprint sensing area includes a plurality of transmitting elements configured to emit a probing signal and a plurality of receiving elements configured to receive a response signal in response to the probing signal.

28. A method of forming a user device, the method comprising:
enclosing a fingerprint sensor in a housing having an opening, wherein the fingerprint sensor has a flexible substrate, a fingerprint sensing area exposed through the opening of the housing, and a plurality of fingerprint sensing elements configured to sense a fingerprint of a finger that is present over the fingerprint sensing area,
wherein a navigation device disposed below the fingerprint sensing area,
wherein a first portion of the flexible substrate is disposed under the fingerprint sensing area and a second portion of the flexible substrate is enclosed within the housing, and
wherein the fingerprint sensing area includes a plurality of transmitting elements configured to emit a probing signal and a plurality of receiving elements configured to receive a response signal in response to the probing signal.

29. A user device, comprising:
a fingerprint sensor having a flexible substrate, a fingerprint sensing area, and a plurality of fingerprint sensing elements configured to sense a fingerprint of a finger that is present over the fingerprint sensing area,
wherein the fingerprint sensing area is configured to be exposed through an opening of a housing,
wherein the fingerprint sensing area is configured to be positioned above a navigation device,
wherein a first portion of the flexible substrate is disposed under the fingerprint sensing area and a second portion of the flexible substrate is configured to be enclosed within the housing, and
wherein the fingerprint sensing area includes a plurality of receiving elements configured to receive a response signal in response to a probing signal, wherein a magnitude of the response signal is related to an RF impedance of a finger ridge or valley.

* * * * *